UNITED STATES PATENT OFFICE.

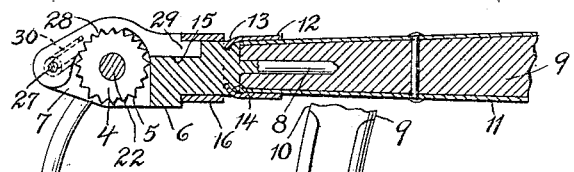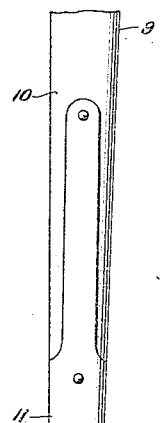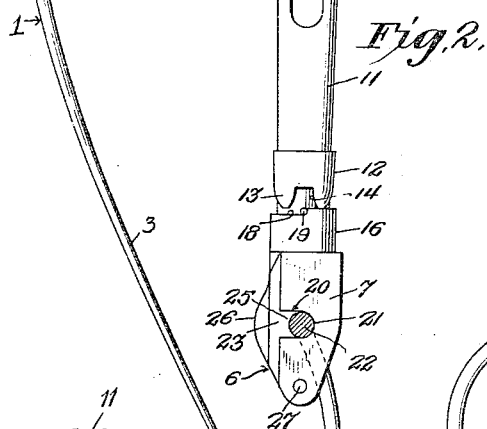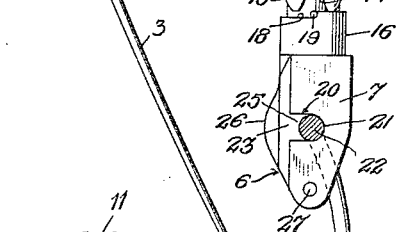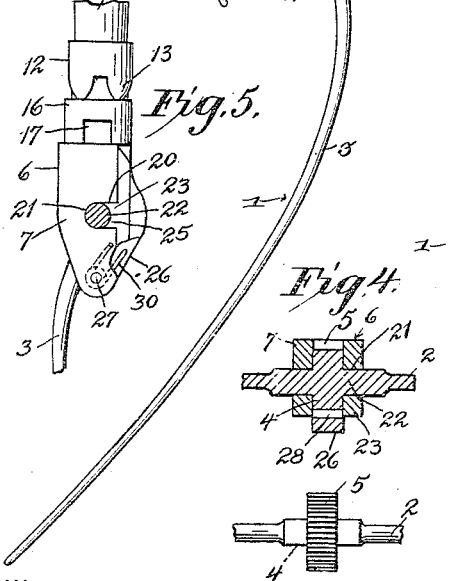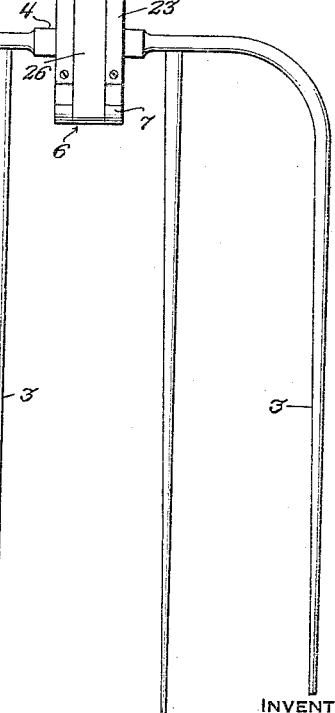

TONY PUGLIESE, OF LOS BANOS, CALIFORNIA.

COMBINATION GARDEN-TOOL.

1,245,024.  Specification of Letters Patent.  Patented Oct. 30, 1917.

Application filed May 15, 1917. Serial No. 168,828.

*To all whom it may concern:*

Be it known that I, TONY PUGLIESE, a citizen of the United States, residing at Los Banos, in the county of Merced and State of California, have invented new and useful Improvements in Combination Garden-Tools, of which the following is a specification.

This invention is an improved combination garden tool which is here shown as a combined pitchfork and rake, the object of the invention being to provide an improved tool of this character which constitutes two tools in one and which may be readily arranged to permit the use of the tool for either of two purposes, and which is simple in construction, is strong and durable, and in which the tool is removable and reversible and in which the various parts may be readily assembled and disassembled.

The invention consists in the construction, combination and arrangement of devices hereinafter described and claimed.

In the accompanying drawings:—

Figure 1 is a plan of a combination tool embodying my invention, showing the same arranged for use as a pitchfork.

Fig. 2 is a side elevation of the same partly in section.

Fig. 3 is a longitudinal sectional view of the same, arranged for use as a rake.

Fig. 4 is a transverse sectional view of the same.

Fig. 5 is a detailed view.

The tool member 1 is here shown as comprising a bar 2 and tines 3 and may be used for the purposes of either a pitchfork or a rake. The tines are longitudinally curved as shown. The bar is provided at its center with a circular locking member 4 provided with peripheral teeth 5.

I also provide a head 6 which is provided at one end with a pair of spaced arms 7 adapted to receive the member 4 between them and the said head is provided at the opposite end with a shank 8 which is fitted in one end of a handle 9 of suitable length. The handle is here shown as provided with the usual curved portion 10 and also with the usual ferrule 11. A ring 12 is fitted on the outer end of the ferrule and is provided with a pair of jaws 13 which are engaged in notches 14 in opposite sides of the head. That portion of the head between the ferrule and the arms 7 is cylindrical and is provided in the outer side at a point between the arms 7 with a recess 15. A locking sleeve 16 is mounted for partial rotation on the cylindrical portion of the head and has a notch 17 which may be arranged in or out of registry with the recess 15. The sleeve also has a slot 18 of suitable length and which is engaged by a stop stud 19 which projects radially from the head and which coacts with the ends of the slot to limit the extent of the turning movement of the sleeve.

Each arm 7 of the head is provided with an opening 20 in one side, the inner end of said opening being semi-circular as at 21 to form a bearing for a cylindrical portion 22 of the bar 2 of the tool. The openings 20 enable the bar of the tool to be pivotally mounted in the arms of the head, with the locking member 4 arranged between the arms. This enables the tool to be arranged in connection with the handle for use as a pitchfork as shown in Fig. 1 and also enables the tool to be removed from the head, reversed, again mounted in the head and turned at an angle to the handle and so that the concave sides of the tines will be on the rear side of the tool, to enable the tool to be used as a rake as shown in Fig. 3.

Each arm 7 is provided with a removable member 23 detachably secured thereon by screws 24 and having a bearing 25 to fit in the opening 20 and engage the bar of the tool. To lock the tool in the desired position I provide a dog 26 which is arranged between the arms 7 and is pivotally mounted at its outer end between the outer ends of said arms by means of a bolt 27 or other suitable device. The dog is provided on its inner side with teeth 28 to engage the teeth 5 of the member 4 when the dog is closed inwardly between the arms 7. The dog is provided at its free inner end with an extended shoulder 29 which enters the recess 15 when the dog is closed. To lock the dog in closed position the sleeve 16 must be turned so that the notch 17 of the sleeve passes to one side of the shoulder or extended portion 29 of the dog, said shoulder or extended portion being thus engaged under the sleeve and the dog being thereby securely locked. By first turning the locking sleeve to cause its notch 17 to register with the recess 15 and uncover the extension or shoulder 29 with the dog, the latter may be opened to release the member 4 and thereby permit the tool to be turned or adjusted in the head as may be desired. By first removing the members 23 of the arms the tool may be detached from the head and then reattached thereto in reverse position to adapt the tool for use either as a pitchfork or as a rake, as the case may be.

A spring 30 is provided to open the dog when the latter is released by the locking sleeve, the spring being here shown as substantially U-shaped and having coiled portions secured on the pivot of the dog.

While I have here shown and described my improved combination tool as a pitchfork and rake the tool may be otherwise constructed and adapted for use for instance as a hoe and shovel or for other purposes by correspondingly modifying the construction of the tool element.

While I have shown and described a preferred form of my invention I would have it understood that changes may be made in the form, proportion and construction of the several parts, without departing from the spirit of my invention and within the scope of the appended claims.

Having thus described my invention, I claim:—

1. In a combination tool of the class described, a head for attachment to a handle and having a pair of spaced arms each having a removable bearing member, a tool having a bar adapted to be mounted pivotally in said arms and bearing members and to be removed and reversed, said bar having a locking member, and said head also having a locking member to engage and coact with that of the bar to lock the tool in place.

2. In a combination tool of the class described, a tool member having a pivoted bar provided with a tooth locking member, a head for attachment to a handle and having a pair of spaced arms provided with bearings for said bar, the locking member of said bar being arranged between said arms, said head also having a cylindrical portion at the inner ends of the arms and provided with a recess arranged between said arms, a locking dog pivotally mounted at its outer end between said arms, said dog having teeth to engage those of the locking member of the bar when the dog is closed between the arms, and being also provided with an extended inner end to enter said recess, and a locking sleeve mounted for turning movement on the cylindrical portion of the head and provided with a notch for movement into and out of registry with said recess, said sleeve when turned with its notch out of alinement with said recess being adapted to engage over the extended inner end of the dog to lock the latter in closed and locking position.

In testimony whereof I affix my signature.

TONY PUGLIESE.

Copies of this patent may be obtained for five cents each, by addressing the "Commissioner of Patents, Washington, D. C."